May 13, 1952 R. R. KEGG 2,596,694
GLASS WELDING METHOD
Filed May 24, 1950
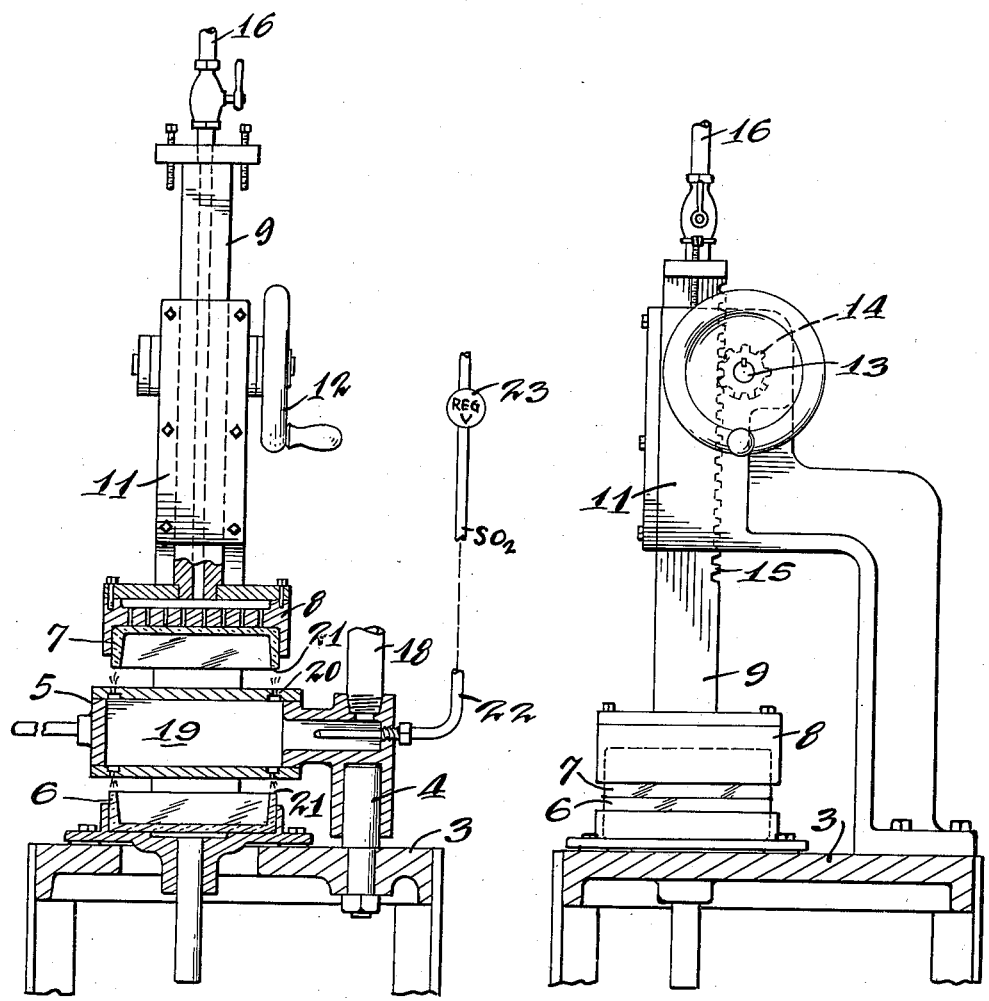
FIG-1-  FIG-2-
INVENTOR:
Robert R. Kegg.
BY
Rule & Hoge
ATTYS.

Patented May 13, 1952

2,596,694

UNITED STATES PATENT OFFICE 2,596,694

GLASS WELDING METHOD

Robert R. Kegg, Toledo, Ohio, assignor to Owens-Illinois Glass Company, a corporation of Ohio Application May 24, 1950, Serial No. 163,872

14 Claims. (Cl. 49—82)

My invention relates to methods of uniting glass parts by fusing or welding, and more particularly to a gas welding method wherein localized surface portions of the glass parts which are to be united, are fused or raised to a welding temperature by a gas flame, the parts being then brought together and subjected to a greater or lesser pressure while at the welding temperature. The invention may be used generally where glass parts are to be united by a fusion method and is of special utility in welding together the component parts of hollow glass articles in which a partial vacuum is to be maintained, and particularly in the electrical field, as more fully set forth hereinafter.

In reheating and welding glass parts together by a gas welding method employing an acetylene-oxygen flame, natural gas and oxygen, or other mixture of gases, there is a strong tendency of the glass to "reboil." The hot flame tends to cause blisters and oxidize the portions of glass which are in actual contact with the flame. This results in an unsightly and defective weld. It also provides a starting point at the blisters for checks which later develop into cracks. This is particularly objectionable in vacuumized, hollow articles, such as electric lamp bulbs, television tubes and the like.

I have discovered that this difficulty may be overcome by the use of sulphur dioxide ($SO_2$) applied in suitably small amounts to the surfaces of the glass during the heating operation, the $SO_2$ gas being preferably mixed with the fuel gas. The $SO_2$ gas strengthens and improves the quality of the seals, as well as increasing the chemical durability of the glass and its resistance to scratching and abrasion.

I have further found by the use of the sulphur dioxide gas in the manner above indicated that any fine seeds or gas bubbles formed at or adjacent to the surface of the glass during the heating process are also liberated. Experiments with various concentrations of $SO_2$ gas, ranging from 1.0% to 0.01%, expressed as the ratio of the volume of $SO_2$ to that of the fuel gas used in the burner (not the air-gas-oxygen mixture), show that an optimum quantity of sulphur dioxide, which gives satisfactory results, is 0.03% by volume of the fuel gas. This small amount is used as it only permits the formation of a minimum of bloom on the glass, whereas 1% is the maximum amount for a desirable bloom, where a bloom is required. Thus 1½% gives an undesirably high amount of bloom. These percentages are of the total fuel gas used.

The use of sulphur dioxide gas serves a further useful purpose in compelling the welding operation to be performed at an adequately high temperature for proper sealing, as below such temperature the bloom gets into the seal and causes leakage and/or checks. If the temperature is too low for proper sealing, the bloom forms on the sealing edge surfaces and prevents adhesion between such surfaces. The bloom appears when the glass is at a softening temperature which may be from 1050° to 1100° F., but disappears when a welding temperature, approximately 1900° F. is reached. These temperatures vary somewhat with the glass composition, but the degree of heating required in practicing the invention is readily determined experimentally.

While the invention may be used with glasses generally, such as flint glass or lime glass, lead glass, etc., the formation of gas bubbles, blisters etc., which the present invention is designed to overcome, is particularly objectionable in welding lead glasses, where it has proved to be a very serious difficulty, and especially in the manufacture of vacuumized tubes in the electric field. In the manufacture of television tubes, for example, a high lead glass is extensively employed, which is made from a glass batch having the following formula:

| | Per cent |
|---|---|
| Silica, $SiO_2$ | 56.7 |
| Alumina, $Al_2O_3$ and iron oxide, $Fe_2O_3$ | 1.4 |
| Sodium oxide, $Na_2O$ | 4.2 |
| Potassium oxide, $K_2O$ | 8.0 |
| Lead oxide, $PbO$ | 29.5 |
| Magnesium oxide, $MgO$ | 0.1 |
| Calcium oxide, $CaO$ | 0.1 |

A comparatively low lead content glass, which has given highly satisfactory results in the manufacture of television tubes, is made from the following glass batch formula:

| | Per cent |
|---|---|
| Silica, $SiO_2$ | 67.9 |
| Alumina, $Al_2O_3$ and iron oxide, $Fe_2O_3$ | 1.0 |
| Sodium oxide, $Na_2O$ | 4.3 |
| Potassium oxide, $K_2O$ | 10.6 |
| Calcium oxide, $CaO$ | 0.1 |
| Magnesium oxide, $MgO$ | 0.1 |
| Barium oxide, $BaO$ | 4.1 |
| Lead oxide, $PbO$ | 11.4 |
| Arsenic oxide, $As_2O_3$ | 0.1 |
| Lithium oxide, $Li_2O$ | 0.4 |

This last formula is disclosed in the co-pending application of Black et al., Serial Number 123,628, filed October 26, 1949, Glass Composition, which issued July 31, 1951, as Patent Number 2,562,292.

The precise nature of the action of the $SO_2$ gas in producing the results above set forth, is not entirely apparent. It is believed, however, that the $SO_2$ reacts with the sodium oxide ($Na_2O$) in the glass and forms sodium sulphate ($Na_2SO_4$). The sodium sulphate in turn reduces the surface tension of the glass, thereby permitting the liberation of the bubbles from the glass. Any fine seeds formed at or close to the surface of the glass during the heating process are also liberated.

Referring to the accompanying drawings:

Fig. 1 is a part sectional elevation of the apparatus, which may be used in practicing the method herein set forth.

Fig. 2 is an elevational view of the same, looking in a direction at right angles to that of Fig. 1.

The apparatus as herein shown is substantially similar to that disclosed in patent to Blau 2,191,951, February 27, 1940, Method for Forming Sealed Hollow Articles of Glass.

Referring to the drawings, the apparatus comprises a table 3 to which is secured a stud 4 with a burner 5 pivotally supported thereon for horizontal movement into and out of an operative position. The burner is designed for heating the edge surfaces of the complementary sections 6 and 7 of a hollow article, shown as a glass building block. The upper section 7 is supported by a chuck 8 attached to the lower end of a vertical plunger 9 mounted for up and down movement of the frame member 11, supported on the table 3 to which it is bolted.

Means for reciprocating the plunger includes a hand wheel 12 keyed to a shaft 13 journaled in the frame 11 and carrying a pinion 14 running in mesh with a rack 15 on the plunger. The upper section 7 of the glass block may be held in the chuck 8 by suction applied through a vacuum line 16. A mixture of the gases for producing the welding flame is supplied to the burner 5 through a pipe 18. This may consist of a mixture of natural gas and oxygen or acetylene and oxygen. The gas flows into the burner chamber 19 and is discharged through nozzles 20 arranged to direct the flames against the edge surfaces 21 of the glass block sections, the nozzles being spaced at short intervals.

The sulphur dioxide gas is applied to the surfaces or edges 21 during the heating of the glass and preferably is mixed with the fuel and combustion supporting gases within the chamber 19. The $SO_2$ gas is supplied through a pipe 22 leading into said chamber. Its flow may be regulated by a valve 23. When the edges of the block sections have been heated to a welding or fusing temperature, the burner 5 is swung out from between the said sections, the plunger 9 is then lowered, bringing the section 7 into engagement with the lower section 6 with the hot edges 21 of the two sections in register, thereby fusing or welding them together.

Modifications may be resorted to within the spirit and scope of my invention.

I claim:

1. The method of welding together glass parts which comprises heating predetermined surface portions of said parts to a welding temperature by the application of localized heat, applying sulphur dioxide gas to said surface portions during the heating, and bringing said surface portions together while at a welding temperature.

2. The method which comprises burning a mixture of combustible and combustion-supporting gases and $SO_2$ gas, applying the flame to predetermined surface areas of glass parts and thereby heating said areas to a welding temperature, and pressing the surfaces together before they are cooled below a welding temperature.

3. The method of uniting glass parts which comprises heating localized surface portions of said parts by an oxidizing flame and thereby fusing surface layers of the glass, applying $SO_2$ gas to said surface portions during said heating and thereafter bringing said surface portions together before they have cooled below a welding temperature.

4. The method of uniting glass parts which comprises burning a mixture of oxygen and a combustible gas, applying the flame to localized surface portions of said parts while the parts are spaced apart and thereby heating said surface portions to a welding temperature, subjecting said surface portions to the action of $SO_2$ gas during said heating, and thereafter bringing said surface portions together before cooling below a welding temperature and thereby welding them together.

5. The method defined in claim 4, the $SO_2$ gas being mixed with the other said gases prior to the combustion.

6. The method defined in claim 4 wherein the amount of $SO_2$ gas is less than 1% by volume of the combustible gas.

7. The method defined in claim 4, the amount of $SO_2$ gas being about 0.03% of the combustible gas.

8. The method of forming a hollow glass article which comprises mixing natural gas, oxygen and sulphur dioxide gas, burning the mixture, applying the flame to the edge surfaces of complementary parts of said article while said surfaces are spaced apart and thereby bringing the surfaces to a welding temperature, and thereafter bringing said surfaces together before they are cooled below a welding temperature and thereby welding said parts together.

9. The method of uniting glass parts by welding which comprises applying to localized surface portions of said parts while said surface portions are separated and in an atmospheric medium, an acetylene-oxygen flame produced by burning a mixture of acetylene, oxygen and sulphur dioxide gas and thereby bringing surface portions to a welding temperature, and bringing surface portions together under a predetermined pressure before they have cooled below a welding temperature.

10. The method defined in claim 2, the glass being a lead glass, the percentage of lead oxide in the glass batch being not less than about 11.4%.

11. The method defined in claim 2, the amount of lead oxide being approximately 29.5% of the ingredients of the glass batch.

12. The method defined in claim 2, the glass being made from a glass batch having approximately the following formula:

| | Per cent |
|---|---|
| Silica, $SiO_2$ | 56.7 |
| Alumina, $Al_2O_3$ and iron oxide, $Fe_2O_3$ | 1.4 |
| Sodium oxide, $Na_2O$ | 4.2 |
| Potassium oxide, $K_2O$ | 8.0 |
| Lead oxide, PbO | 29.5 |
| Magnesium oxide, MgO | 0.1 |
| Calcium oxide, CaO | 0.1 |

13. The method defined in claim 2, the glass being made from a glass batch having approximately the following formula:

| | Per cent |
|---|---|
| Silica, $SiO_2$ | 67.9 |
| Alumina, $Al_2O_3$ and iron oxide, $Fe_2O_3$ | 1.0 |
| Sodium oxide, $Na_2O$ | 4.3 |
| Potassium oxide, $K_2O$ | 10.6 |
| Calcium oxide, CaO | 0.1 |
| Magnesium oxide, MgO | 0.1 |
| Barium oxide, BaO | 4.1 |
| Lead oxide, PbO | 11.4 |
| Arsenic oxide, $As_2O_3$ | 0.1 |
| Lithium oxide, $Li_2O$ | 0.4 |

14. The method of forming a hollow glass article which comprises mixing a fuel gas, oxygen and sulphur dioxide gas, burning the mixture, applying the flame to the edge surfaces of complementary parts of said article while said surfaces are spaced apart and continuing the application of the flame until the said surfaces are brought to a temperature at which bloom formation disappears, and thereafter bringing said surfaces together before they are cooled below a welding temperature and thereby welding said parts together.

ROBERT R. KEGG.

REFERENCES CITED

The following references are of record in the file of this patent:

UNITED STATES PATENTS

| Number | Name | Date |
|---|---|---|
| 2,238,153 | Blau | Apr. 15, 1941 |
| 2,241,511 | Greene | May 13, 1941 |